(12) United States Patent
Sun (10) Patent No.: US 10,846,120 B2
(45) Date of Patent: Nov. 24, 2020

(54) CONFIGURATION TRACKING IN VIRTUALIZED COMPUTING ENVIRONMENTS

(71) Applicant: VMware, Inc., Palo Alto, CA (US)

(72) Inventor: Keyong Sun, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 199 days.

(21) Appl. No.: 15/950,189

(22) Filed: Apr. 11, 2018

(65) Prior Publication Data

US 2019/0317786 A1 Oct. 17, 2019

(51) Int. Cl.
*G06F 11/00* (2006.01)
*G06F 9/455* (2018.01)
*G06F 11/22* (2006.01)

(52) U.S. Cl.
CPC ...... *G06F 9/45558* (2013.01); *G06F 11/2247* (2013.01); *G06F 2009/45595* (2013.01)

(58) Field of Classification Search
CPC ............. G06F 9/45558; G06F 11/2247; G06F 2009/45595

USPC .......................................................... 714/33
See application file for complete search history.

(56) References Cited

U.S. PATENT DOCUMENTS

| | | | |
|---|---|---|---|
| 9,942,118 B1 * | 4/2018 | Muhammad | H04L 41/0813 |
| 10,452,464 B1 * | 10/2019 | Lieberman | G06F 11/0709 |
| 2011/0238792 A1 * | 9/2011 | Phillips | G06F 9/44505 |
| | | | 709/220 |

* cited by examiner

*Primary Examiner* — Yair Leibovich
(74) *Attorney, Agent, or Firm* — Su IP Consulting (57) ABSTRACT

Example methods are provided for configuration tracking in a virtualized computing environment. One example method may comprise detecting a configuration request to configure a physical component, or a virtual component, of a host; identifying a particular interface via which the configuration request is initiated by a client device; and identifying one or more attributes associated with the configuration request. The particular interface may be one of multiple interfaces supported by the host or the management entity, or both. The method may also comprise generating configuration history information specifying the particular interface and the one or more attributes associated with the configuration request.

18 Claims, 6 Drawing Sheets

CONFIGURATION TRACKING IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtualization computing instances such as virtual machines running different operating systems may be supported by the same physical machine (e.g., referred to as a "host") in the virtualized computing environment. Each virtual machine is generally provisioned with virtual resources to run an operating system and applications. The virtual resources may include central processing unit (CPU) resources, memory resources, storage resources, network resources, etc. In practice, it is important for hosts in the virtualized computing environment to run in a stable and reliable manner. However, to support various applications and services, hosts 110A-C are generally configured and reconfigured over time by different users for various reasons. In this case, it may be challenging to keep track of the configuration performed, which is undesirable when configuration-related problems arise and debugging is required.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to configuration tracking will now be explained in more detail using FIG. 1, which is a schematic diagram illustrating example virtualized computing environment 100 in which configuration tracking may be performed. It should be understood that, depending on the desired implementation, virtualized computing environment 100 may include additional and/or alternative components than that shown in FIG. 1.

Figure 1:
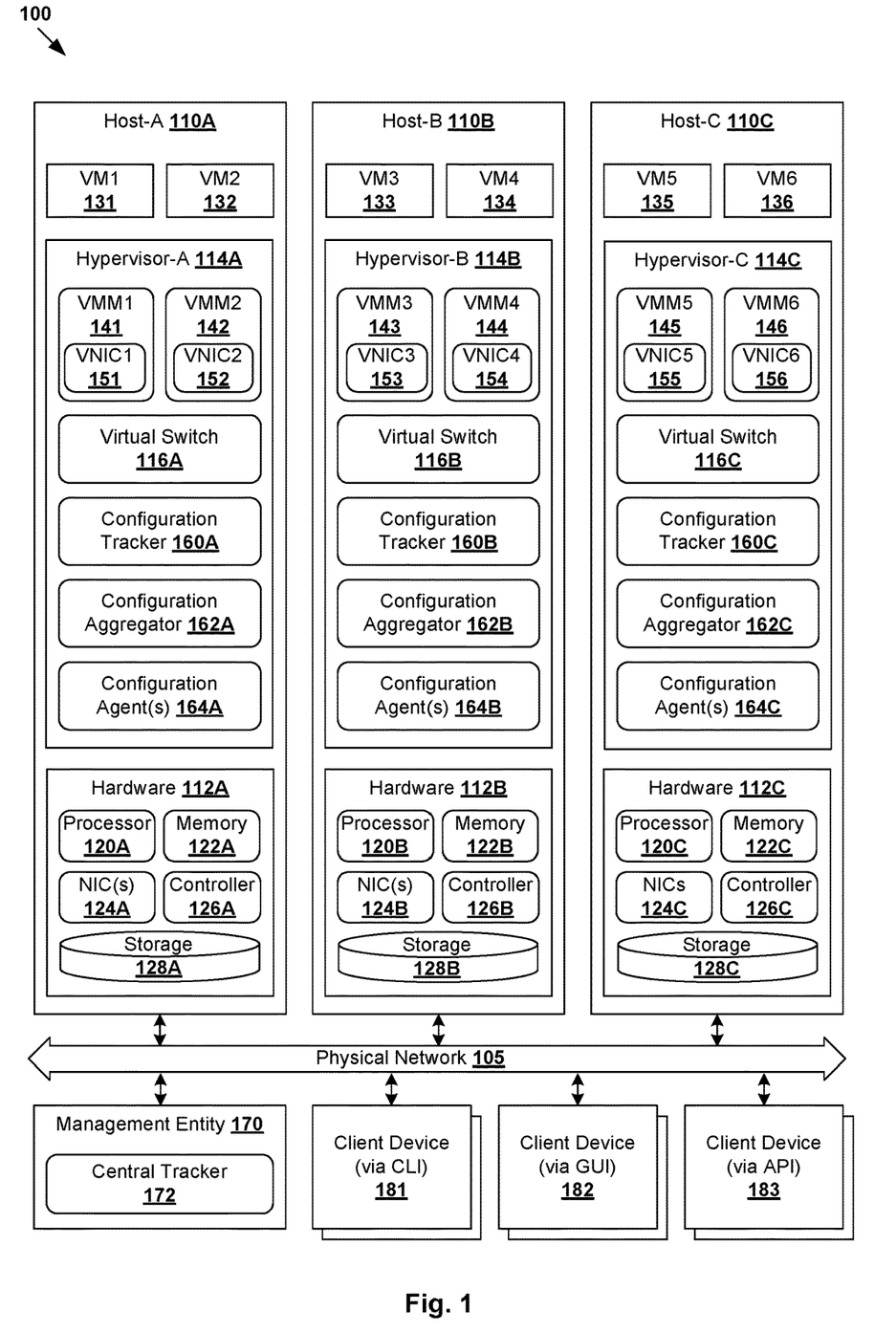
FIG. 1 is a schematic diagram illustrating an example virtualized computing environment in which configuration tracking may be performed.

In the example in FIG. 1, virtualized computing environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs). For example, host-A 110A supports VM1 131 and VM2 132; host-B 110B supports VM3 133 and VM4 134; and host-C 110C supports VM5 135 and VM6 136. In practice, virtualized computing environment 100 may include any number of physical hosts (also known as "computer systems," "computing devices", "host computers", "physical servers", "server systems", etc.), where each host may be supporting tens or hundreds of VMs.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each VM to support a guest operating system (OS) and applications. For example, corresponding to hardware 112A/112B/112C, the virtual resources may include virtual CPU(s), guest physical memory (i.e., memory visible to the guest OS running in a VM), virtual disk, virtual network interface controller (VNIC), etc. Hypervisor 114A/114B/114C also implements virtual machine monitors (VMMs) 141-146 to emulate hardware resources, such as e.g., VNICs 151-156 for respective VMs 131-136. In practice, VMMs 141-146 may be considered as components that are part of respective VMs 131-136, or alternatively, separated from VMs 131-136. In both cases, VMMs 141-146 each maintain the state of respective VNICs 151-156 to facilitate migration of respective VMs 131-136.

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers, etc. Hypervisor 114A/114B/114C may be implemented any suitable virtualization technology, such as VMware ESX® or ESXi™ (available from VMware, Inc.), Kernel-based Virtual Machine (KVM), etc.

Hypervisor 114A/114B/114C further implements virtual switch 116A/116B/116C to handle egress packets from, and ingress packets to, corresponding VMs 131-136. For example, through software-defined networking (SDN), logical switches and logical distributed routers may be implemented in a distributed manner and can span multiple hosts to connect VMs 131-136. For example, logical switches that provide logical layer-2 connectivity may be implemented collectively by virtual switches 116A-C and represented internally using forwarding tables (not shown for simplicity) at respective virtual switches 116A-C. Further, logical distributed routers that provide logical layer-3 connectivity may be implemented collectively by distributed router instances (not shown for simplicity) at respective hypervisors 114A-C. As used herein, a "logical switch" may refer generally to an SDN construct that is collectively implemented by multiple virtual switches, whereas a "virtual switch" may refer generally to a software switch or software implementation of a physical switch.

Depending on the desired implementation, VMs 131-136 may be deployed on one or more logical overlay networks that are formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. For example in FIG. 1, VM1 131 on host-A 110A, VM3 133 and VM4 134 on host-B 110B, as well as VM5 135 and VM6 136 on host-C 110C may be located on the same logical layer-2 segment, i.e., VXLAN segment with VXLAN network identifier (VNI)=5001. As used herein, the term "packet" may refer generally to a group of bits that can be transported together from a source to a destination, such as message, segment, datagram, etc. The term "layer-2" may refer generally to a Media Access Control (MAC) layer; and "layer-3" to a network or Internet Protocol (IP) layer in the Open System Interconnection (OSI) model, although the concepts described herein may be used with other networking models.

Hosts 110A-C may be managed using any suitable management entity or entities 170 (one shown for simplicity). For example, management entity 170 may provide a platform for users operating client devices 181-183 to manage hosts 110A-C, such as to configure hardware 112A-C, hypervisors 114A-C and VMs 131-136, etc. One example of management entity 170 is the vCenter™ server available from VMware, Inc. Other examples include an SDN manager (e.g., NSX manager component of VMware NSX® from VMware, Inc.) that operates on a management plane, and SDN controller (e.g., NSX controller component of VMware NSX®) that operates on a central control plane. The SDN manager and SDN controller may provide a platform for SDN configuration such as configuration of logical switches, logical routers, logical overlay networks, etc. A further example is a management entity implementing a platform for configuring hosts 110A-C using any suitable cloud management software, such as OpenStack™ (a trademark of the OpenStack Foundation), etc. In practice, management entity 170 and client devices 181-183 may be implemented using physical machines, VMs, or a combination thereof.

In virtualized computing environment 100, it is important for hosts 110A-C to run in a stable and reliable manner. To support various applications and services, hosts 110A-C are generally configured and reconfigured over time by different users for various reasons. In a production environment, only the latest configuration will take effect, thereby overriding all older configurations. In this case, as hosts 110A-C and corresponding hypervisors 114A-C operate for a long period of time, it will be increasingly challenging to keep track of all the different configurations performed. As such, when configuration-related problems arise, it is challenging to perform debugging to find the root cause of the problems without a good understanding of the configurations performed. This adversely affects the performance of hosts 110A-C and corresponding VMs 131-136.

Configuration Tracking

According to examples of the present disclosure, improvements may be made to the performance of hosts 110A-C in virtualized computing environment 100 by performing configuration tracking using a "context-aware" approach. As hosts 110A-C are configured and reconfigured over time, configuration history information may be generated to identify an interface via which each configuration request is initiated, as well as attribute(s) associated with the configuration request. This way, should configuration-related problems arise at a later time, the configuration history information may be used to perform facilitate troubleshooting or debugging in a more efficient manner. This may in turn reduce system downtime due to those problems, thereby improving the availability of operations and/or services supported by hosts 110A-C.

Depending on the desired implementation, examples of the present disclosure may be performed by any suitable "computer system," such as host 110A/110B/110C, management entity 170 in communication with host 110A/110B/110C, or any other entity, etc. For example, host 110A/110B/110C may implement any suitable module(s) to perform configuration tracking, such as configuration tracker 160A/160B/160C, configuration aggregator 162A/162B/162C, configuration agent(s) 164A/164B/164C, etc. Similarly, management entity 170 may implement any suitable module (s), such as central tracker 172, etc.

Figure 2:
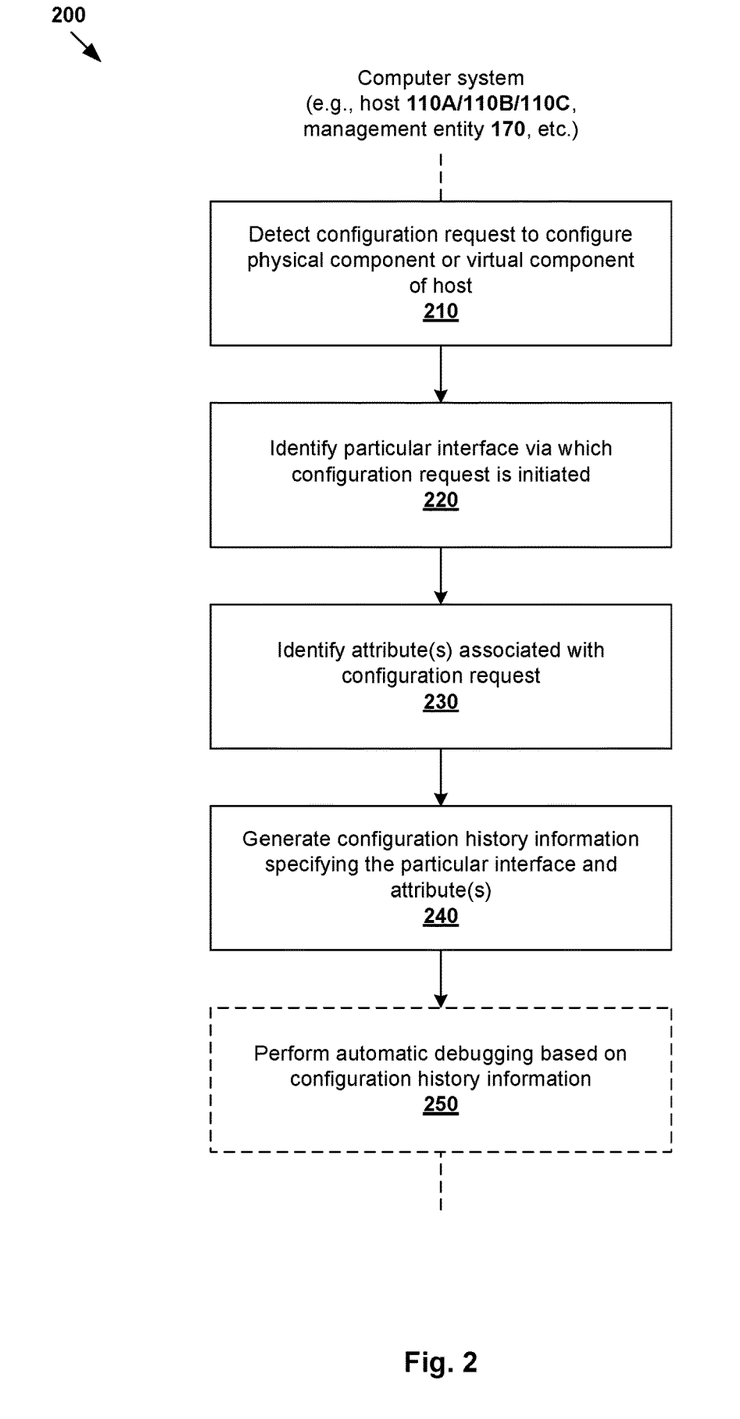
FIG. 2 is a flowchart of an example process for a computer system to perform configuration tracking in a virtualized computing environment.

In more detail, FIG. 2 is a flowchart of example process 200 for a computer system to perform configuration tracking in virtualized computing environment 100. Example process 200 may include one or more operations, functions, or actions illustrated by one or more blocks, such as 210 to 250. The various blocks may be combined into fewer blocks, divided into additional blocks, and/or eliminated depending on the desired implementation.

At 210 in FIG. 2, a configuration request to configure a physical component or a virtual component of host 110A/110B/110C is detected. The "configuration request" may be any suitable computer-readable instruction and/or data for adding, removing, updating, controlling, testing, upgrading, downgrading, enabling or disabling a particular component, or a feature and/or data of the component, etc. Depending on the desired implementation, the "physical component" may be a component of hardware 112A/112B/112C, such as processor(s) 120A/120B/120C, memory 122A/122B/122C, physical NICs 124A/124B/124C, storage controllers 126A/126B/126C, physical storage 128A/128B/128C, etc. The "virtual component" may be any suitable software-implemented component of host 110A/110B/110C, such as hypervisor 114A/114B/114C, virtual switch 116A/116B/116C, corresponding VMs 131-136, etc.

At 220 and 230 in FIG. 2, a particular interface via which the configuration request is initiated by client device 181/182/183 (e.g., manually or programmatically) and attribute(s) associated with the configuration request are identified. The particular interface may be identified at block 220 from multiple interfaces (also known as "sources" or "sources of truth"), such as command line interface (CLI), Representational State Transfer (REST or RESTful) application programming interface (API), user interface (UI) or graphical user interface (GUI), message channel, or any other interface (OTH) or combination thereof, etc. Each interface may be supported by host 110A, management entity 170, or a combination thereof. Any suitable attribute(s) may be identified at block 230, such as time at which the configuration request is detected or initiated by the client; category associated with the configuration request; and content describing a configuration performed on the host based on the configuration request and one or more parameters associated with the configuration.

At 240 in FIG. 2, configuration history information specifying the particular interface and attribute(s) is generated. In practice, the configuration history information may be generated to provide "context" associated with each configuration performed, such as where configuration requests originate, when configuration requests are detected or initiated, what the purpose of the configuration is, which component is affected, what configuration parameters are used, any combination thereof, etc. The configuration history information may be generated to facilitate a debugging process that is performed manually (e.g., by a network administrator), automatically (e.g., using a script or debugging tool), or a combination thereof.

At 250 in FIG. 2, for example, automatic debugging may be performed based on the configuration history information generated at block 240. Here, the term "automatic debugging" may refer generally to a computer-implemented process for identifying, locating and/or analyzing bugs or anomalies that affect the operation of host 110A/110B/110C. (Note that block 250 is shown in dotted line to indicate that it may be performed independently from blocks 210-240). As will be described further using FIG. 5 and FIG. 6, automatic debugging may involve retrieving the configuration history information and initiating a test configuration request via the particular interface specified by the configuration history information. Automatic debugging may be performed on a test machine, such as by initiating the test configuration request via the particular interface to configure a physical component, or a virtual component, of the test machine; and identifying a problem associated with the test machine. The knowledge of the interface and attribute(s) is useful during debugging, such as to identify the different interfaces via which configuration requests are initiated, etc. In practice, different interfaces may be used by different users to configure various components in virtualized computing environment 100.

Depending on the desired implementation, aggregation may be performed periodically to maintain configuration history information that is as complete as possible. For example, this may involve host 110A/110B/110C retrieving configuration history information generated within a predetermined time interval, processing the configuration history information to generate aggregated configuration history information and sending the aggregated configuration history information to management entity 170, which may in turn generate a configuration history report. This should be contrasted against conventional approaches that do not involve any aggregation. This often results in newer log information to override older log information, thereby making system debugging more complicated due to incomplete information. Various examples will be discussed below using FIGS. 3-6.

Configuration Requests

Figure 3:
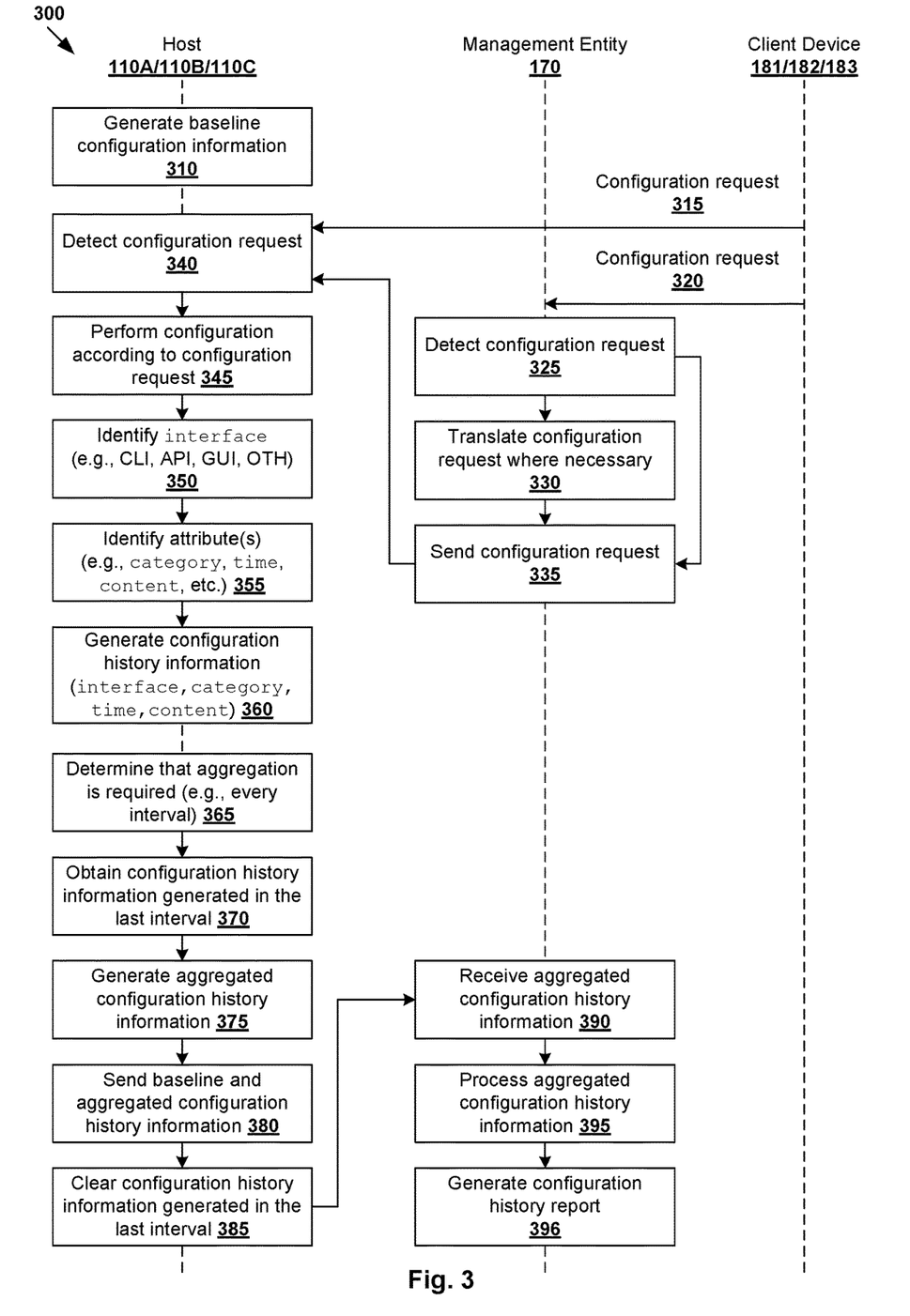
FIG. 3 is a flowchart of an example detailed process for a computer system to perform configuration tracking in a virtualized computing environment.

FIG. 3 is a flowchart of example detailed process 300 for a computer system to perform configuration tracking in virtualized computing environment 100. Example process 300 may include one or more operations, functions, or actions illustrated at 310 to 396. The various operations, functions or actions may be combined into fewer blocks, divided into additional blocks, and/or eliminated depending on the desired implementation. The example in FIG. 3 will be explained using FIG. 4, which is a schematic diagram illustrating example configuration history information 450-470 generated based on configuration requests 420-440.

As explained using FIG. 2, examples of the present disclosure may be performed by any suitable "computer system" capable of acting as host 110A/110B/110C, or management entity 170. For simplicity, an example computer system will be explained using host-A 110A. In this case, blocks 310, 340-360 may be performed using configuration tracker 160A and/or configuration agent 164A, and blocks 365-385 using configuration aggregator 162A. Blocks 325-335 and 390-396 may be performed by management entity 170, such as using central tracker 172 and any other component(s).

At 310 in FIG. 3, host-A 110A generates baseline configuration information, such as in response to detecting that hypervisor-A 114A is up and running, etc. The baseline configuration information may include any suitable information describing a current configuration of host-A 110A (i.e., prior to subsequent updates below), such as the configuration of hardware 112A, hypervisor-A 114A, VMs 131-132, a combination thereof, etc.

Figure 4:
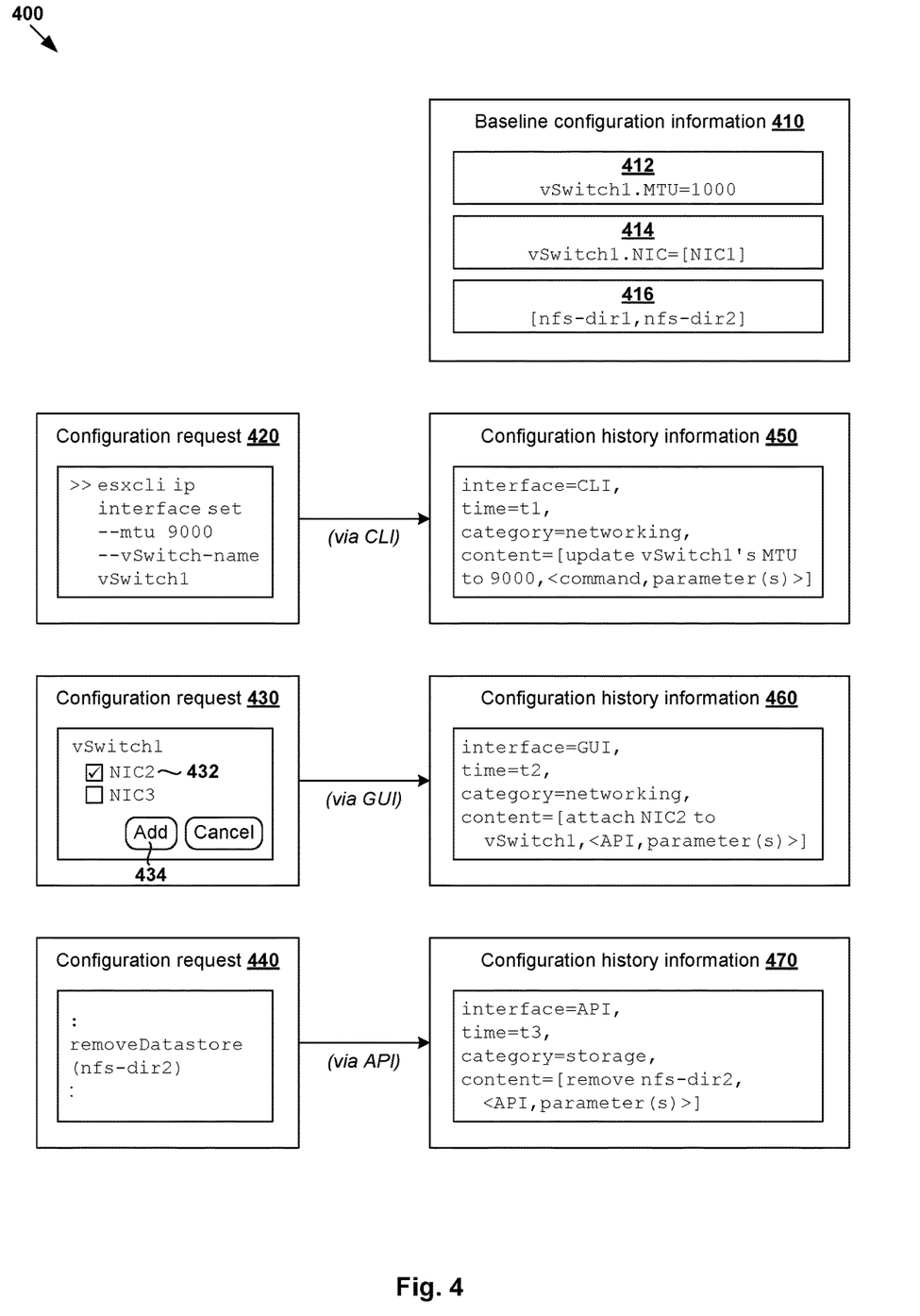
FIG. 4 is a schematic diagram illustrating example configuration history information generated based on configuration requests.

Referring also to FIG. 4, baseline configuration information 410 associated with host-A 110A may describe that virtual switch 116A is configured with a maximum transmission unit (MTU) of 1000 bytes (see 412), and connected to one physical NIC labelled "NIC1" (see 414). Baseline configuration information 410 also describes that host-A 110A has access to a file system (see 414), such as network file system (NFS) volumes labelled "nfs-dir1" and "nfs-dir2" that are located on a network attached storage (NAS) file system, etc. Baseline configuration information 410 may be expressed in any suitable format(s) other than that shown in FIG. 4.

At 340 and 345 in FIG. 3, host-A 110A detects a configuration request and performs a configuration accordingly. The configuration request may be initiated by client device 181/182/183, either manually (e.g., client device is operated by a network administrator) or programmatically (e.g., using a script). The configuration request may be detected by host-A 110A directly (see 315) or indirectly via management entity 170 (see 320). As shown in FIG. 4, various configuration requests may be initiated via different interfaces, including CLI (see 420), GUI (see 430) and API (see 440).

In a first example (see 420 in FIG. 4), first client device 181 may send a configuration request via CLI. In this example, the CLI is expressed as "esxcli ip interface set --mtu 9000 -vswitch-name=vSwitch1" to update the MTU size of virtual switch 116A from the existing 1000 bytes (see 412) to 9000 bytes. The CLI may identify a command to perform a particular configuration (e.g., "ip interface set"), a particular resource or component (e.g., "vswitch-name=vSwitch1" representing virtual switch 116A) to be configured, and one or more parameters (e.g., "mtu 9000") of the configuration. Depending on the desired implementation, in response to receiving the configuration request, the command detected via CLI may be executed in a shell of hypervisor 114A.

In a second example (see 430 in FIG. 4), second client device 182 may initiate a configuration request via a GUI supported by management entity 170. In practice, the configuration request may be detected by management entity 170 based on any suitable UI event(s) associated with a client's interaction (e.g., selection, activation, update, etc.) with UI element(s). The "UI event" may be captured by second client device 182 using any suitable device, such as a keyboard to capture keyboard events (e.g. key(s) pressed), mouse to capture mouse events (e.g. cursor position, key(s) pressed) and touch screen to capture touch screen events (e.g. position touched), etc. A particular "UI element" on the GUI may be a window, button, menu, text box, list, application icon, menu bar, scroll bar, title bar, status bar, size grip, toolbar, dropdown list, etc. In the example in FIG. 4, the configuration request may be initiated by selecting "NIC2" (see 432) and clicking an "Add" button (see 434).

Referring to FIG. 3 again, at 325, 330 and 335, in response to detecting a configuration request initiated via a GUI, management entity 170 may perform any necessary translation before sending the configuration request to host-A 110A. For example, the translation may involve processing UI events to identify an associated API function to attach a physical NIC labelled as "NIC2" to virtual switch 116A labelled as "vSwitch1." In this case, block 345 may involve management entity 170 invoking the API function with parameters identifying "NIC2" and "vSwitch1" to perform the configuration. Configuration agent(s) 164A at host-A 110A may be used to detect the API invocation by management entity 170.

In a third example (see 430 in FIG. 4), third client device 183 may initiate a configuration request via an API supported by host-A 110A. The configuration request identifies an API function (e.g., "removeDatastore( )") to be executed, along with any parameter (e.g., "nfs-dir2" identifying a datastore to be removed). The configuration request may be sent from third client device 183 directly to host-A 110A, or indirectly via management entity 170 (e.g., for security and/or management purposes). In the latter case, in response to detecting the API invocation, management entity 170 may invoke the API function supported by host-A 110A according to blocks 325-335 in FIG. 3. The API invocation by third client device 183 and/or management entity 170 may be detected by host-A 110A using configuration agent(s) 164A.

Depending on the desired implementation, various other configuration requests may be used to configure any physical or virtual component of host-A 110A. For example, the configuration requests may relate to host management (e.g., rebooting, updating, etc.), storage management (e.g., configuring logical unit numbers (LUNs), paths to storage, storage policies, datastore, etc.), virtual machine management (e.g., registering, powering ON or OFF, connecting or disconnecting virtual devices, etc.), networking configuration (e.g., configuration relating to virtual switch 116A, a distributed virtual switch formed by virtual switches 116A-C, domain name server (DNS), firewall, gateway, networking protocol(s), logical switches, logical routers, logical overlay networks, etc.), security configuration (e.g., authentication, encryption, etc.), resource management configuration (e.g., resource allocation, resource pools, power management, failover, etc.), or any combination thereof.

Configuration History Information

According to examples of the present disclosure, configuration history information may be generated to provide "context" awareness, such as where configuration requests originate, when configuration requests are detected, what purpose each configuration request is, which component(s) are affected by the configuration, etc. In particular, at 350 and 355 in FIG. 3, in response to detecting the configuration request, host-A 110A identifies an interface via which the configuration request is initiated, and attribute(s) associated with the configuration request. At 360 in FIG. 3, host-A 110A generates and stores configuration history information specifying the interface and attribute(s).

The "interface" may be CLI, GUI, API, message channel or OTH (representing any other interface). Any suitable attribute(s) may be identified, such as a "category" to be configured based on the configuration request, a "time" at which the configuration request is detected or initiated, and "content" describing a configuration performed on the host based on the configuration request and one or more parameters associated with the configuration. For example, the "category" may be "general" for general configuration, "networking" for networking-related configuration, "storage" for storage-related configuration, "computer for configuration relating to compute resource virtualization, etc. Depending on the interface via which the configuration request is initiated, the "content" may describe a command provided via a CLI, API function(s) invoked via API or GUI, message received via a message channel, and any associated parameter(s). In practice, a "message channel" may represent a communication channel or tunnel between management entity 170 and client device 181/182/183, or host 110A/110B/110C and client device 181/182/183, etc.

In a first example in FIG. 4, block 350 may involve identifying the interface to be CLI based on a command initiated by first client device 181. In response to detecting first configuration request 420 initiated by first client device 181, host-A 110A generates first configuration history information 450 that specifies (interface=CLI, time=t1, component=networking, content="update vSwitch1's MTU to 9000"). In particular, based on command="esxcli ip interface set --mtu 9000 -vswitch-name=vSwitch1," host-A 110A may identify that the command is initiated via a CLI (i.e., interface), relates to networking configuration (i.e., category) and more specifically MTU configuration of virtual switch 116A labelled as "vSwitch1" (i.e., content). The content may further include the command initiated by first client device 181 and associated parameters.

In a second example in FIG. 4, block 350 may involve identifying the interface to be GUI in response to management entity 170 detecting UI event(s) initiated by second client device 182 via a GUI supported by management entity 170 and translating the at least one UI event to an API invocation. In this case, based on second configuration request 430 initiated by second client device 182, host-A 110A generates second configuration history information 460 that specifies (interface=GUI, time=t2, category=networking, content="attach NIC2 to vSwitch1"). The "content" may further identify an API function invoked and associated parameter(s). As explained using 325-335 in FIG. 3, the API function may be invoked by management entity 170 after translating UI event(s) detected via the GUI. Depending on the desired implementation, management entity 170 may also send information relating to the detected UI event(s) to host-A 110A for inclusion in second configuration request 430. Alternatively or additionally, in response to the detection at block 325 in FIG. 3, management entity 170 may tag second configuration request 430 with information identifying the interface before sending a translated and tagged request to host-A 110A at block 335 in FIG. 3. In this case, host-A 110A may identify interface=GUI based on the tag information.

In a third example, block 350 may involve identifying the interface to be API based on an API invocation initiated by third client device 183. In this case, based on third configuration request 440, host-A 110A generates third configuration history information 470 that specifies (interface=API, time=t3, category=storage, content="remove nfs-dir2"). In particular, based on the API invoked by third client device 183, host-A 110A may identify that third configuration request 440 is initiated via API, and the API relates to storage configuration and more specifically datastore removal. Similar to the second example, the "content" may further identify an API function invoked and associated parameter(s). Further, alternatively or additionally, in response to the detection at block 325 in FIG. 3, management entity 170 may tag third configuration request 440 with information identifying the interface. In this case, host-A 110A may identify interface=API based on the tag information.

At 365, 370 and 375 in FIG. 3, host-A 110A (e.g., using configuration aggregator 162A) performs periodic aggregation to generate aggregated configuration history information to management entity 170. In particular, in response to determination that aggregation is required at a predetermined time interval (see 365), host-A 110A obtains configuration history information (e.g., including 420-440) generated in the last time interval (see 370) and performs any suitable processing (see 375), such as sorting, filtering, collating, serializing, clustering, etc. For example in FIG. 4, block 375 may involve sorting the configuration history information according to interface, time, category, etc. In another example, block 375 may involve filtering or clustering the configuration history information, such as based on a particular physical or virtual component, data center tenant, VM, logical overlay network, etc.

At 380 and 385 in FIG. 3, host-A 110A (e.g., using configuration aggregator 162A) sends the aggregated configuration history information to management entity 170, and clears the configuration history information generated in the last interval. Host-A 110A also sends the baseline configuration information generated at block 315 in FIG. 3 to management entity 170. In practice, any suitable time interval may be used, such as 10 minutes, an hour, etc. It is not necessary to perform 370-385 if no configuration is performed during the last time interval.

At 390, 395 and 396 in FIG. 3, in response to receiving the baseline configuration information and aggregated configuration history information from host-A 110A, management entity 170 (e.g., using central tracker 172) generates a configuration history report. In practice, management entity 170 may process the aggregated configuration history information from one host, or multiple hosts, to generate the configuration history report. Block 395 may include any suitable processing, such as sorting, filtering, collating, serializing, clustering, etc. The configuration history report may be generated to include the baseline configuration information and configuration history information associated with a particular physical or virtual component, data center tenant, VM, logical overlay network, etc.

Although some examples have been described using host-A 110A, it should be understood that, additionally or alternatively, blocks 350-360 may be performed by management entity 170 in communication with host-A 110A.

For example, in response to detecting a configuration request at block 325, management entity 170 may identify a particular interface via which the configuration request is initiated and associated attribute(s) according to blocks 350 and 355 in FIG. 3. Management entity 170 may then generate configuration history information identifying the interface and attribute(s) according to block 360 in FIG. 3.

Automatic Debugging

According to examples of the present disclosure, the configuration history information generated according to the example in FIG. 3 may be used to facilitate a debugging process to reduce system downtime and improve performance. In practice, the debugging process may be performed manually by a user (e.g., network administrator) or automatically (e.g., using a script or debugging tool). In both cases, configuration history information may be used to re-create or re-play the configurations performed to identify any configuration-related problem(s).

Figure 5:
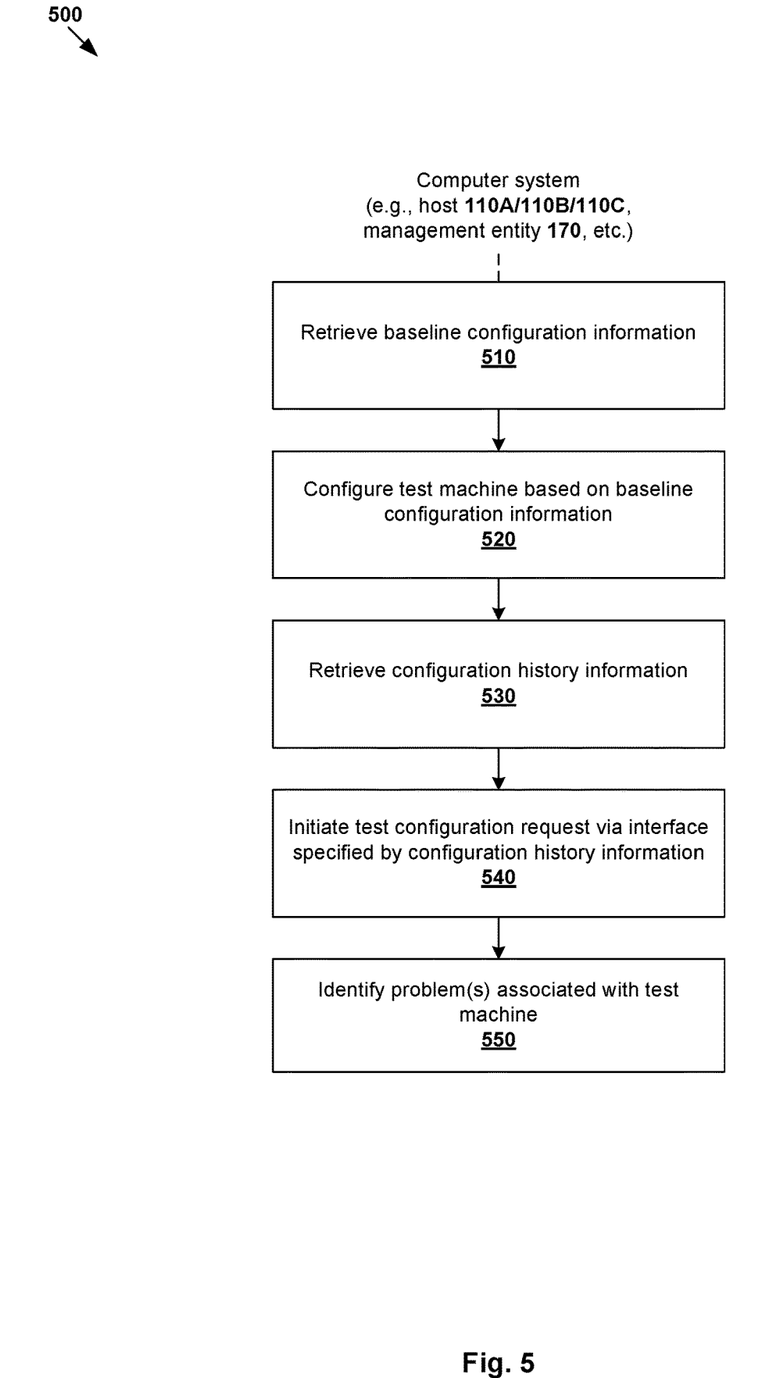
FIG. 5 is a flowchart of an example process for a computer system to perform automatic debugging based on configuration history information in a virtualized computing environment.

In more detail, FIG. 5 is a flowchart of example process 500 for a computer system to perform automatic debugging based on configuration history information in virtualized computing environment 100. Example process 500 may include one or more operations, functions, or actions illustrated by one or more blocks, such as 510 to 550. The various blocks may be combined into fewer blocks, divided into additional blocks, and/or eliminated depending on the desired implementation. Some examples will be discussed using FIG. 6, which is a schematic diagram illustrating example automatic debugging 600 based on configuration history information. Depending on the desired implementation, the following examples may be performed by a "computer system," such as host 110A/110B/110C, management entity 170, or any other entity in virtualized computing environment 100. The computer system may perform the following using an automatic debugging tool, etc.

At 510 and 520 in FIG. 5, a test machine (see 610 in FIG. 6) may be configured based on baseline configuration information 410 generated by host-A 110A. For example, test machine 610 may be configured in a test environment to mimic host-A 110A for debugging purposes. Alternatively, test machine 610 may also be host-A 110A itself. Using the example in FIG. 4, test machine 610 may be configured with a virtual switch with MTU=1000 bytes (see 412), and attached with a physical NIC labelled "NIC1" (see 414). Further, test machine 610 may also be configured to access two datastores labelled "nfs-dir1" and "nfs-dir2" (see 416).

At 530 and 540 in FIG. 5, configuration requests may be generated to configure test machine 610 based on configuration history information 450-470 generated by host-A 110A. For example, configuration history information 450-470 may be retrieved from the configuration history report generated by management entity 170. This way, at 550 in FIG. 5, the configuration steps performed by host-A 110A may be recreated to identify any problem(s) for debugging purposes.

Figure 6:
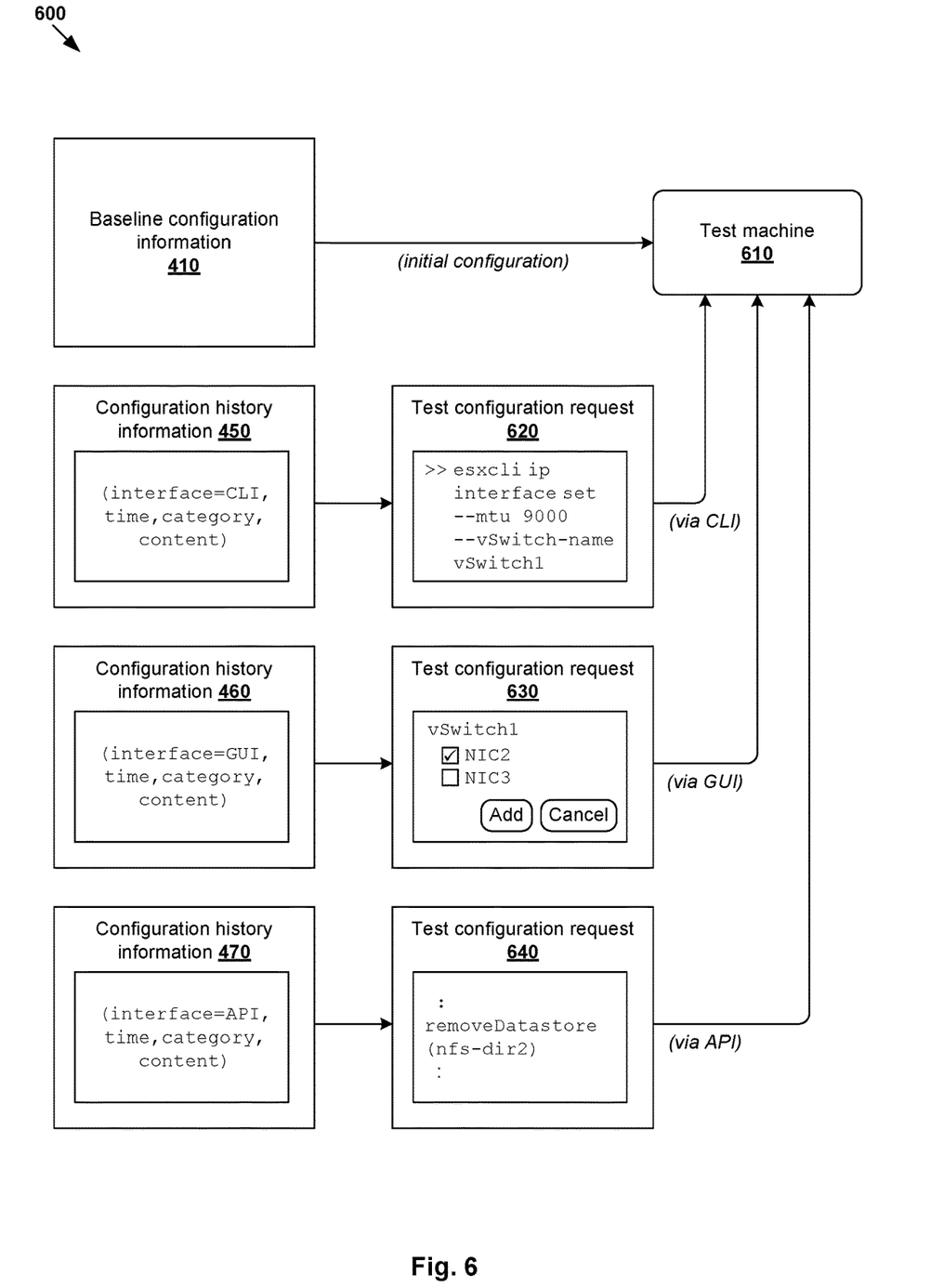
FIG. 6 is a schematic diagram illustrating example automatic debugging based on configuration history information in a virtualized computing environment.

For example in FIG. 6, test configuration request 620 may be generated based on first configuration history information 450. Based on interface=CLI, first configuration request 620 is a command to configure an MTU size of a virtual switch supported by test machine 610. The command and associated parameter(s) may be generated based on the "content" attribute in first configuration history information 450 discussed using FIG. 4. Another test configuration request 630 may be generated based on second configuration history information 460. Based on interface=GUI, UI event(s) may be recreated to attach a physical NIC labelled as "NIC2" to the virtual switch. In response to detecting the UI event(s), management entity 170 may invoke an API supported by test machine 610.

In a further example, test configuration request 640 may be generated based on third configuration history information 470. Based on interface=API, an API is invoked to remove a datastore labelled "nfs-dir2." In both cases, the API to be invoked and associated parameter(s) may be identified from the "content" attribute in configuration history information 460/470 discussed using FIG. 4. In practice, if automatic debugging is related to a particular category, it should be understood that some configuration history information may be omitted. For example, to perform automatic debugging relating to networking, it is not necessary to generate test configuration request 640 based on third configuration history information relating to category=storage. Similarly, block 530 may involve retrieving the relevant configuration history information to perform automatic debugging for a particular physical or virtual component, data center tenant, VM, logical overlay network, etc.

Any suitable problem(s) may be identified at block 550 in FIG. 5. For example, when increasing an MTU size of a virtual switch from 1000 bytes to 9000 bytes, it is important for the entire network path on which the virtual switch is located to support the new MTU size. Otherwise, packets that are larger than a path MTU (PMTU) of the network path will be fragmented or discarded. These packets are generally configured to carry a "Do not fragment" (DF) flag, which is set to prevent fragmentation that unnecessarily wastes processing and network resources. This is because fragmenting a packet involves dividing the packet into smaller fragments, which causes more overhead for a destination device to wait until all fragments are received and to reassemble the fragments. Also, since each fragment generally has the same header overhead as the original message, the total number of bytes that needs to be transmitted increases. This may in turn lead to poorer packet transmission performance and loss of network connectivity. Based on test configuration request 620 that is generated based on first configuration history information 450, the problem associated with network connectivity may be detected after the configuration is made. Any other problem(s) affecting the operation or performance of other components in virtualized computing environment 110 may be detected according to examples in the present disclosure.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, computer systems capable of acting as respective hosts 110A-C and management entity 170 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a computer system to perform configuration tracking in a virtualized computing environment, the computer system being capable of acting as a host or a management entity in communication with the host, wherein the method comprises:

detecting, by the computer system, a configuration request to configure a physical component, or a virtual component, of the host;

identifying, by the computer system, a particular interface via which the configuration request is initiated by a client device, wherein the particular interface is one of multiple interfaces supported by the host or the management entity, or both, and wherein the particular interface is one of the multiple interfaces comprising command line interface (CLI), application programming interface (API), graphical user interface (GUI) and message channel;

identifying, by the computer system, one or more attributes associated with the configuration request;

generating, by the computer system, configuration history information specifying the particular interface and the one or more attributes associated with the configuration request; and performing, by the computer system, automatic debugging based on the configuration history information.

2. The method of claim 1, wherein identifying the particular interface comprises one of the following:
   identifying the particular interface to be CLI based on a command initiated by the client device via the CLI;
   identifying the particular interface to be API based on an API invocation initiated by the client device; and
   identifying, by the computer system acting as the host, the particular interface to be GUI in response to the management entity detecting at least one user interface (UI) event initiated by the client device via a GUI supported by the management entity and translating the at least one UI event to an API invocation.

3. The method of claim 1, wherein identifying the one or more attributes comprises:
   identifying one or more of the following attributes: time at which the configuration request is detected or initiated by the client device; a category associated with the configuration request; and content describing a configuration performed on the host based on the configuration request and one or more parameters associated with the configuration.

4. The method of claim 1, wherein the method further comprises:
   retrieving, by the computer system acting as the host, configuration history information generated within a predetermined time interval;
   processing, by the computer system acting as the host, the configuration history information to generate aggregated configuration history information; and
   sending, by the computer system acting as the host, the aggregated configuration history information to the management entity for generating a configuration history report.

5. The method of claim 1, wherein performing automatic debugging further comprises:
   retrieving the configuration history information and initiating a test configuration request via the particular interface specified by the configuration history information.

6. The method of claim 5, wherein the method further comprises:
   initiating the test configuration request via the particular interface to configure a physical component, or a virtual component, of a test machine; and
   identifying a problem associated with the test machine.

7. A non-transitory computer-readable storage medium that includes a set of instructions which, in response to execution by a processor of a computer system, cause the processor to perform a method of configuration tracking in a virtualized computing environment, the computer system being capable of acting as a host or a management entity in communication with the host, wherein the method comprises:
   detecting, by the computer system, a configuration request to configure a physical component, or a virtual component, of the host;

identifying, by the computer system, a particular interface via which the configuration request is initiated by a client device, wherein the particular interface is one of multiple interfaces supported by the host or the management entity, or both, and wherein the particular interface is one of the multiple interfaces comprising command line interface (CLI), application programming interface (API), graphical user interface (GUI) and message channel;

identifying, by the computer system, one or more attributes associated with the configuration request;

generating, by the computer system, configuration history information specifying the particular interface and the one or more attributes associated with the configuration request; and performing, by the computer system, automatic debugging based on the configuration history information.

8. The non-transitory computer-readable storage medium of claim 7, wherein identifying the particular interface comprises one of the following:
   identifying the particular interface to be CLI based on a command initiated by the client device via the CLI;
   identifying the particular interface to be API based on an API invocation initiated by the client device; and
   identifying, by the computer system acting as the host, the particular interface to be GUI in response to the management entity detecting at least one user interface (UI) event initiated by the client device via a GUI supported by the management entity and translating the at least one UI event to an API invocation.

9. The non-transitory computer-readable storage medium of claim 7, wherein identifying the one or more attributes comprises:
   identifying one or more of the following attributes: time at which the configuration request is detected or initiated by the client device; a category associated with the configuration request; and content describing a configuration performed on the host based on the configuration request and one or more parameters associated with the configuration.

10. The non-transitory computer-readable storage medium of claim 7, wherein the method further comprises:
   retrieving, by the computer system acting as the host, configuration history information generated within a predetermined time interval;
   processing, by the computer system acting as the host, the configuration history information to generate aggregated configuration history information; and
   sending, by the computer system acting as the host, the aggregated configuration history information to the management entity for generating a configuration history report.

11. The non-transitory computer-readable storage medium of claim 7, wherein performing automatic debugging further comprises:
   retrieving the configuration history information and initiating a test configuration request via the particular interface specified by the configuration history information.

12. The non-transitory computer-readable storage medium of claim 11, wherein the method further comprises:
   initiating the test configuration request via the particular interface to configure a physical component, or a virtual component, of a test machine; and
   identifying a problem associated with the test machine.

13. A computer system configured to perform configuration tracking in a virtualized computing environment, the computer system being capable of acting as a host or a management entity in communication with the host, wherein the computer system comprises:
- a processor; and
- a non-transitory computer-readable medium having stored thereon instructions that, in response to execution by the processor, cause the processor to:
  - detect, by the computer system, a configuration request to configure a physical component, or a virtual component, of the host;
  - identify, by the computer system, a particular interface via which the configuration request is initiated by a client device, wherein the particular interface is one of multiple interfaces supported by the host or the management entity, or both, and wherein the particular interface is one of the multiple interfaces comprising command line interface (CLI), application programming interface (API), graphical user interface (GUI) and message channel;
  - identify, by the computer system, one or more attributes associated with the configuration request;
  - generate, by the computer system, configuration history information specifying the particular interface and the one or more attributes associated with the configuration request; and
  - perform, by the computer system, automatic debugging based on the configuration history information.

14. The computer system of claim 13, wherein the instructions for identifying the particular interface cause the processor to perform one of the following:
- identifying the particular interface to be CLI based on a command initiated by the client device via the CLI;
- identifying the particular interface to be API based on an API invocation initiated by the client device; and
- identifying, by the computer system acting as the host, the particular interface to be GUI in response to the management entity detecting at least one user interface (UI) event initiated by the client device via a GUI supported by the management entity and translating the at least one UI event to an API invocation.

15. The computer system of claim 13, wherein the instructions for identifying the one or more attributes cause the processor to:
- identify one or more of the following attributes: time at which the configuration request is detected or initiated by the client device; a category associated with the configuration request; and content describing a configuration performed on the host based on the configuration request and one or more parameters associated with the configuration.

16. The computer system of claim 13, wherein the instructions further cause the processor to:
- retrieve, by the computer system acting as the host, configuration history information generated within a predetermined time interval;
- process, by the computer system acting as the host, the configuration history information to generate aggregated configuration history information; and
- send, by the computer system acting as the host, the aggregated configuration history information to the management entity for generating a configuration history report.

17. The computer system of claim 13, wherein the instructions for performing automatic debugging further cause the processor to:
- retrieve the configuration history information and initiate a test configuration request via the particular interface specified by the configuration history information.

18. The computer system of claim 17, wherein the instructions cause the processor to:
- initiate the test configuration request via the particular interface to configure a physical component, or a virtual component, of a test machine; and
- identify a problem associated with the test machine.

* * * * *